United States Patent [19]

Horrocks

[11] Patent Number: 4,661,705
[45] Date of Patent: Apr. 28, 1987

[54] QUENCH, VOLUME AND ACTIVITY DETERMINATIONS IN A LIQUID SCINTILLATION FLOW SYSTEM

[75] Inventor: Donald L. Horrocks, Placentia, Calif.

[73] Assignee: Beckman Instruments, Inc., Fullerton, Calif.

[21] Appl. No.: 612,181

[22] Filed: May 21, 1984

[51] Int. Cl.⁴ .............................................. G01T 1/00
[52] U.S. Cl. .................................... 250/328; 250/369
[58] Field of Search .................... 250/328, 303, 358.1, 250/361 R, 369

[56] References Cited

U.S. PATENT DOCUMENTS

| | | | |
|---|---|---|---|
| 2,907,881 | 10/1959 | Roucayrol et al. | 250/71 |
| 3,816,743 | 6/1974 | Ting et al. | 250/106 |
| 3,931,520 | 1/1976 | Bell et al. | 250/328 |
| 3,950,643 | 4/1976 | Charlton | 250/303 |
| 4,060,728 | 11/1977 | Horrocks | 250/328 |
| 4,075,480 | 2/1978 | Horrocks | 250/328 |
| 4,085,325 | 4/1978 | Atallah et al. | 250/328 |
| 4,187,426 | 2/1980 | Jordan | 250/364 |
| 4,187,428 | 2/1980 | Pochwalski et al. | 250/366 |
| 4,267,451 | 2/1981 | Berick | 250/328 |
| 4,292,520 | 9/1981 | Jordan | 250/328 |
| 4,418,281 | 11/1983 | Horrocks | 250/328 |

OTHER PUBLICATIONS

Horrocks, D. L., "The H-Number Concept", Scientific Instruments Div., Beckman Instruments, Inc., Tech. Report 1095-NUC-77-IT, Mar. 1977.

Primary Examiner—Janice A. Howell
Attorney, Agent, or Firm—W. H. May; G. T. Hampson; S. R. Markl

[57] ABSTRACT

A method for use with liquid scintillation flow systems including flowing a mixture comprising a sample and a liquid scintillation medium through a flow detector, the liquid scintillation medium including a radionuclide marker having an energy distribution different from the sample. A pulse height distribution spectrum is determined and a unique point on the portion of the pulse height distribution spectrum representing the energy spectrum of the medium is found, a pulse height value related to such unique point providing a value related to the degree of quench present in the mixture. By comparing such pulse height value to a pulse height value obtained in a like manner for a calibration standard, a degree of quench present in the mixture is indicated. Furthermore, the counts detected for the liquid scintillation medium during a measurement period may be related to the specific activity of the liquid scintillation medium to determine the volume of liquid scintillation medium flowing during the measurement period. The volume of sample flowing during such period may also be determined by relating the liquid scintillation medium volume to a ratio of sample to liquid scintillation medium flowing through the flow detector. Sample count rate is corrected for quench and sample specific activity is determined.

12 Claims, 3 Drawing Figures

QUENCH, VOLUME AND ACTIVITY DETERMINATIONS IN A LIQUID SCINTILLATION FLOW SYSTEM

BACKGROUND OF THE INVENTION

The present invention relates generally to the field of liquid scintillation counting and in particular to improved methods for determining quench, volume and activity in a liquid scintillation flow system.

Liquid scintillation flow systems are well known in the art for providing an indication of the radioactivity present in a flowing sample. In such systems, the radioactive sample is mixed with an organic liquid scintillation medium and the resulting mixture is passed through a flow detector. The liquid scintillation medium emits light flashes or scintillations in response to nuclear disintegrations occurring within the sample. The intensity of a scintillation is proportional to the energy of the corresponding nuclear disintegration. A photodetector, such as a photomultiplier tube, within the flow detector detects the scintillations and provides output pulses having amplitudes proportional to the corresponding scintillations. In the liquid scintillation flow system, the pulses are counted in a plurality of pulse height channels or "windows" having upper and lower pulse height limits that together span a predetermined range of pulse heights. The counts for the windows may be plotted with respect to corresponding pulse heights to provide a pulse height spectrum representing the energy spectrum of the nuclear radiation emitted by the radioactive sample.

In order to determine the specific activity of the sample, it is necessary to determine values for three parameters, namely, the count rate of the sample, the volume of the sample producing the measured count rate, and the quench of the mixture flowing through the flow detector.

Most prior liquid scintillation flow systems have measured only count rate, uncorrected for sample quench or sample volume. Consequently, in such systems, it has been essentially impossible to accurately determine the specific activity of the sample.

With respect to mixture quench, it is well known in the art that "quench" refers to the decrease in the number of photons reaching the photodetector for a given nuclear disintegration in the liquid scintillation medium. For example, the production of photons in the scintillation medium may be decreased or emitted photons may be absorbed. In each case, the result is the reduction of the number of photons detected by the photodetector for a given nuclear disintegration. Because quenching decreases the number of photons applied to the photodetector, some scintillation events which would be detectable in an unquenched sample are below the photodetector detection threshold in a quenched sample. The result is that the number of counts per minute detected by the photodetector for a quenched sample is decreased as compared with an otherwise identical unquenched sample. The scintillation count rate detected in a quenched sample as compared to the disintegration rate of the sample is commonly referred to as "counting efficiency".

Quenching acts equally on all events produced by the same type of excitation particle, for example, electron (beta), alpha, proton, and so on. Thus, if quenching is sufficient to reduce the measured response for one disintegration by a given percentage, it will reduce all responses by the same percentage. In a liquid scintillation flow system, quenching results in a shift of the pulse height spectrum detected by the system to lower pulse height values, which is commonly referred to as "pulse height shift".

A few liquid scintillation flow systems have attempted to measure the quench of the mixture flowing through the flow detector. It is known, for example, to attempt to measure such quench by the use of the sample channels ratio method. However, such method is only accurate at high sample count rates, thus making the accurate quench determination of low activity samples essentially impossible. Moreover, prior art quench determination methods cannot be performed simultaneously with the measurement of sample count rate. Consequently, such methods require that sample count rate and quench be determined at different times. In a flow system, the count rate and quench characteristics of the sample flowing through the flow detector may change with time, rendering accurate quench determination difficult or impossible.

As noted above, a third parameter to be measured is the volume of sample which was measured by the liquid scintillation flow system. To determine such volume, it is known to use a cell within the flow detector having a predetermined volume. Using the volume per unit time flow rate of the system, the volume of the mixture and thus the sample may be determined. However, such a determination is affected by the accuracy to which the cell volume is measured and further by the accuracy to which such volume flow rate is determined. The accuracy of the volume flow rate may be affected, for example, by the accuracy of a pumping apparatus which delivers the mixture to the system. Consequently, inaccuracies in either the cell volume or the pumping system may affect the accuracy to which the specific activity of the sample may be determined. As used herein, specific activity means the disintegrations per unit time per unit volume of the sample.

SUMMARY OF THE INVENTION

A method in accordance with the present invention overcomes the limitations and drawbacks in the prior art described above. Such a method enables the determination of quench simultaneously with the determination of the sample count rate. Moreover, the present method enables the determination of the volume of sample detected during a counting period.

Towards the foregoing ends, the method includes flowing the sample in a liquid scintillation medium through a flow detector and developing a pulse height distribution spectrum for the mixture. The liquid scintillation medium advantageously comprises a scintillating compound and a radionuclide marker wherein the marker has an energy distribution substantially different from the sample. The method further includes detecting a unique point on the portion of the pulse height spectrum representing the energy spectrum of the marker and determining a pulse height value related to such unique point. The pulse height value so obtained is a value related to the degree of quench present in the mixture. By comparing the pulse height value of the unique point to a pulse height value obtained in a like manner for a calibration standard, an indication of the degree of quench present in the mixture is determined. In the embodiment disclosed herein, the radionuclide marker is an alpha emitting radionuclide.

Further in accordance with the present invention, the number of counts detected for the portion of the pulse height spectrum representing the energy spectrum of the marker may be determined and the volume of the liquid scintillation medium flowing through the flow detector may be determined according to a predetermined specific activity of the marker in the liquid scintillation medium. By relating the volume of the medium to a ratio of the volume of sample with respect to the volume of liquid scintillation medium, the volume of the sample may also be determined.

DESCRIPTION OF A PREFERRED EMBODIMENT

Figure 1:
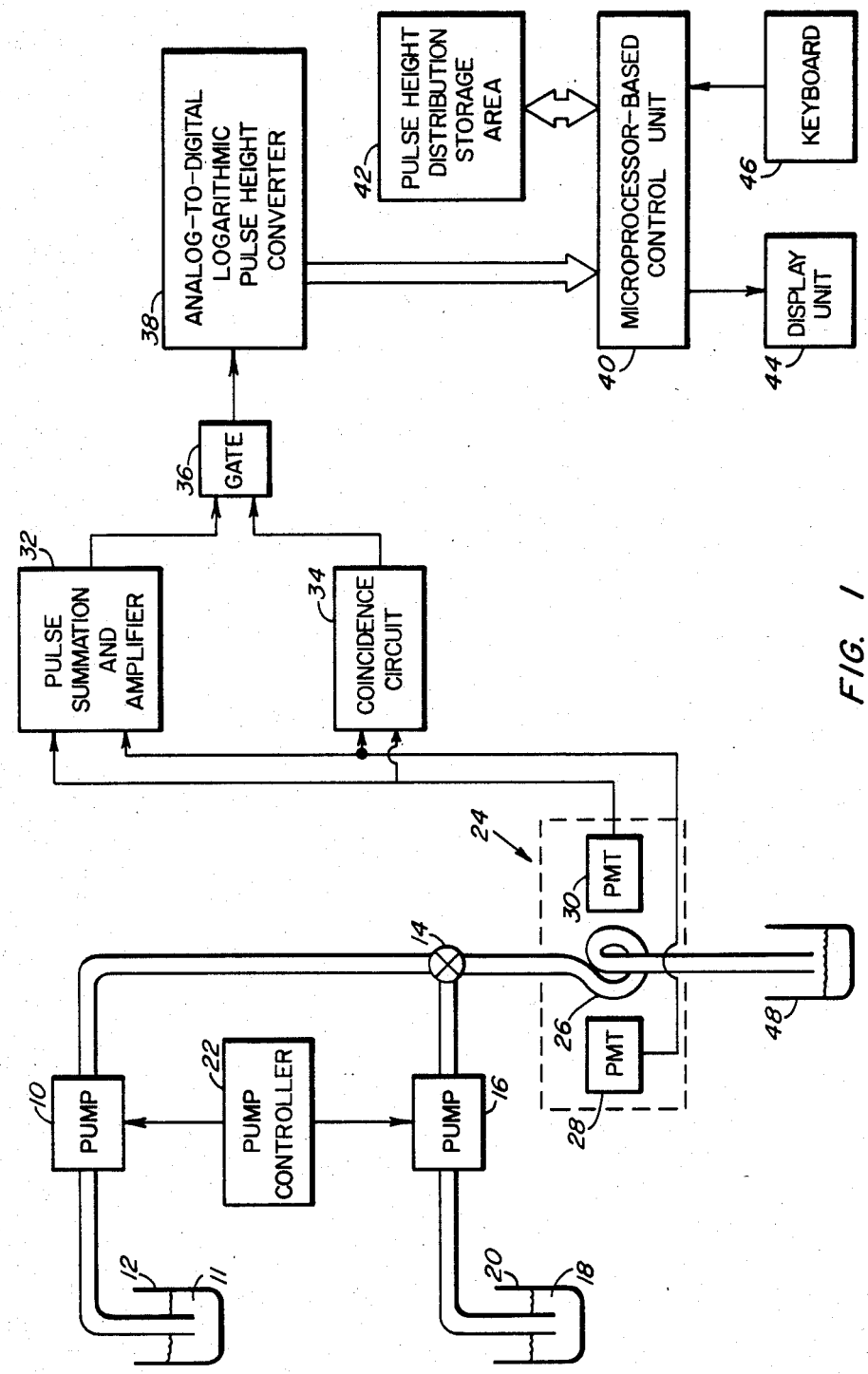
FIG. 1 is a block diagram of a liquid scintillation flow system adapted for practicing the method of the present invention.

With respect first to FIG. 1, there is shown a liquid scintillation flow system adapted to practice the method of the present invention. A pump 10 is adapted to draw liquid radionuclide sample 11 from a suitable container 12. The pump 10 delivers the sample under pressure to a mixer 14. A second pump 16 is adapted to draw liquid scintillation medium 18 from a suitable container 20. The liquid scintillation medium 18 comprises a conventional organic scintillation compound, suitable solvents, and, in accordance with the present invention, a radionuclide marker. In the embodiment disclosed herein, the radionuclide marker is preferably an alpha source such as $^{233}U$. The alpha source is included within the liquid scintillation medium 18 to provide a predetermined specific activity for the liquid scintillation medium. In one embodiment of the present invention, such specific alpha activity may be 1,000 counts per minute (CPM) per 100 ul. The specific activity of the alpha marked liquid scintillation medium 18 may be determined, for example, in a conventional fashion using conventional liquid scintillation counting techniques.

The pumps 10 and 16 are controlled by means of a pump controller 22 which enables the pumps 10 and 16 to be adjusted to provide predetermined ratios of sample 11 and liquid scintillation medium 18 to the mixer 14. The pumps 10 and 16, mixer 14 and pump controller 22 are of conventional design and are well known, for example, in the liquid chromatography art. As an example of a specific embodiment, the pumps 10 and 16, the mixer 14, and the pump controller 22 are all available as a gradient system, model number 344, available from the Altex Scientific Operations of Beckman Instruments, Inc.

With continued reference to FIG. 1, the mixture from the mixer 14 flows to a flow detector shown generally at 24. The flow detector 24 includes a flow cell 26 of conventional design. The flow cell 26 may include a section of transparent conduit. Two photomultiplier tubes (PMTs) 28 and 30 are positioned within the flow detector 24 so as to detect scintillations occurring within the flow cell 26. The output of each PMT 28 and 30 is a pulse having an amplitude proportional to the intensity of the detected scintillation. The output pulses from the PMTs 28 and 30 are applied to a pulse summation and amplifier 32 and a coincidence circuit 34. The pulse summation and amplifier 32 sums the pulses from the PMTs 28 and 30 and amplifies the summed result producing an analog pulse output.

The output of each PMT 28 and 30 is also coupled as an input to a coincidence circuit 34 which produces an output pulse upon receipt of essentially coincident input pulses. The outputs from the pulse summation and amplifier 32 and the coincidence circuit 34 are both applied to an analog gate 36 which passes the analog output from the pulse summation and amplifier 32 when the output pulse from the coincidence circuit 34 is also received by the gate 36. Thus, when a scintillation event within the mixture is detected by the PMTs 28 and 30, the coincident pulses from such PMTs 28 and 30 are summed by the pulse summation and amplifier 32 and are applied to the gate 36. The coincident pulses from the PMTs 28 and 30 are also detected by the coincidence circuit 34 which applies a pulse to the gate 36. In the presence of the output pulse from the coincidence circuit 34, the analog output pulse from the pulse summation and amplifier 32 is passed by the gate 36.

The output of the gate 36 is applied to an analog-to-digital (ADC) logarithmic pulse height converter 38 which provides a digital output logarithmically proportional to the height of the analog pulse applied thereto. The digital output of the ADC pulse height converter 38 is applied to a microprocessor-based control unit 40. The control unit 40 is of conventional design and includes a microprocessor and related memory and input-output interface units, all well known in the art. The control unit 40 compares the value of the digital output from the ADC pulse height converter 38 to a plurality of predetermined values which define a plurality of energy ranges or windows together spanning a predetermined energy or pulse height range. According to the value represented by the digital output from the ADC pulse height converter 38, the control unit 40 determines which window the digital value falls within and accordingly increments one storage location within a pulse height distribution storage area 42. The pulse height distribution storage area 42 includes a plurality of storage locations corresponding to the windows established by the control unit 40. As the liquid scintillation counting process is performed, the values stored in the various storage locations within the storage area 42 together represent a pulse height distribution curve. The storage area 42 may comprise, for example, a portion of the memory accessible to and controlled by the microprocessor within the control unit 40, each storage location within such storage area 42 being cleared or reset prior to the start of a liquid scintillation counting procedure.

The liquid scintillation flow system of FIG. 1 further includes a conventional display unit 44 such as a cathode ray tube (CRT) and a suitable input device such as a keyboard 46. The display unit 44 can display the count rate derived in a particular window or may display a curve graphically showing the pulse height distribution spectrum.

It will be recognized that the pulse summation and amplifier 32, coincidence circuit 34, gate 36, ADC logarithmic pulse height converter 38, control unit 40, pulse height distribution area 42, display unit 44 and input device 46 are of conventional design and instruments embodying such structural elements are well known in the liquid scintillation art. Such instruments include the Series 5800 and 9800 liquid scintillation counters available from Beckman Instruments, Inc., although those skilled in the art will recognize other suitable instruments for practicing the method of the present invention.

Turning now to a description of the operation and thus the preferred embodiment of the method in accordance with the present invention, the pump controller 22 is adjusted to provide some predetermined ratio of sample 11 to liquid scintillation medium 18 into the flow detector 24. Specifically, the pumps 10 and 16 are controlled by the pump controller 22 to provide the predetermined ratio of sample 11 and medium 18 to the mixer 14. The sample 11 and medium 18 are mixed in the mixer 14. The resulting mixture flows through the flow cell 26 of the flow detector 24 into a waste container 48.

Scintillations occurring within the flow cell 26 are detected coincidentally by the PMTs 28 and 30 which provide coincident pulses to the pulse summation and the amplifier 32 and the coincidence circuit 34. The pulses are summed and amplified and are applied to the gate 36. Because the pulses from the PMTs 28 and 30 are coincident, the gate 36 passes the analog pulse output of the pulse summation and amplifier 32 to the ADC logarithmic pulse height converter 38. The converter 38 converts the analog pulse to a digital representation logarithmically proportional to the analog pulse. The digital representation is applied to the control unit 40 which compares the digital representation to the pulse height windows. A storage location in the storage 42 corresponding to the window within which the digital representation falls is then incremented by the control unit 40.

As the mixture flows through the cell 26 and scintillation counting proceeds as just described, the collected counts in the storage locations may be read by the control unit 40 and displayed on the display unit 44 as a pulse height spectrum.

Figure 2:
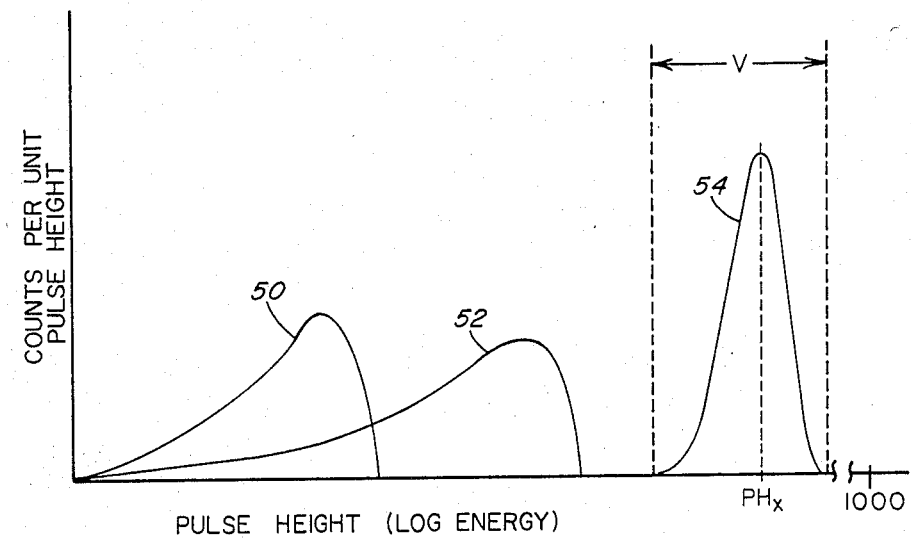
FIG. 2 is a pulse height spectrum for a sample containing two radionuclides and a liquid scintillation medium including a radionuclide marker in accordance with the present invention.

Three pulse height spectra are illustrated in FIG. 2. Spectra 50 and 52 represent the response of the system to tritium and carbon 14, two radionuclides within the sample 11. A third spectrum 54 illustrates the response of the system to the liquid scintillation medium 18 and more particularly to the radionuclide marker within the medium 18. It is to be noted that by selecting the marker within the medium to be an alpha source, the energy of the medium as represented by the spectrum 54 is substantially greater than the highest energy represented by either of the spectra 50 or 52 and thus does not overlap either spectrum 50 or 52. Consequently, spectra 50 and 54, 52 and 54, or all three spectra 50–54 may be concurrently counted by the system of FIG. 1, providing concurrent quench determination and sample counting as will now be described.

Figure 3:
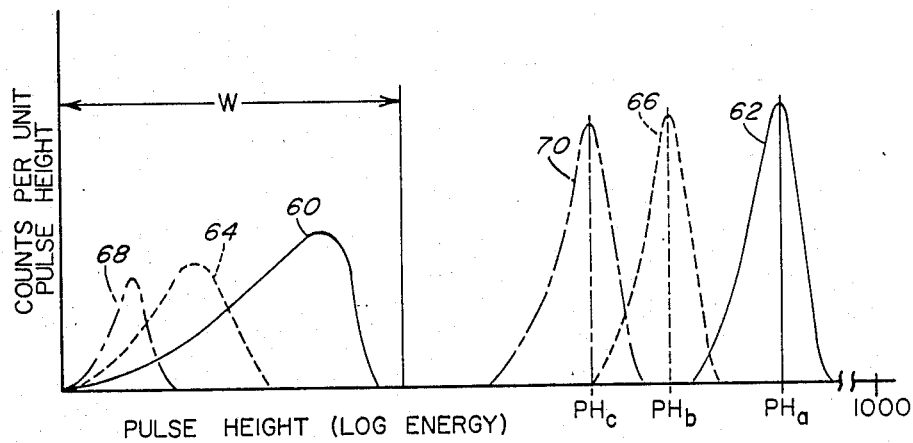
FIG. 3 are pulse height spectra for the liquid scintillation medium and one of the radionuclides depicted in FIG. 2 which show the effect of quench.

With respect now to FIG. 3, pulse height spectra for a tritium sample and the medium 18 are shown for varying degrees of quench present in the mixture flowing through the flow cell 26. Spectra 60 and 62 represent pulse height curves for tritium and the medium 18, respectively, for a first degree of quench in the mixture. As the degree of quench increases in the mixture, both pulse height spectra are shifted to the left as seen in FIG. 3. With an increased degree of quench, the spectrum 60 is shifted to the left as seen by spectrum 64 and the spectrum 62 is also shifted to the left as seen by spectrum 66. As a third example and as the quench of the mixture is increased still further, the spectrum of 64 is shifted to the left as seen by spectrum 68 and the spectrum 66 is shifted to the left as seen by the spectrum 70.

The position of each of the spectra 62, 66 and 70 along the pulse height (log energy) axis is related to the degree of quench present in the mixture and may be used to provide an indication of the degree of quench present in each of the examples. Such position is indicated by detecting a unique point on the respective spectrum which in the embodiment disclosed herein is the peak point of such spectrum. Peak points for each of the spectra 62, 66 and 70 are detected and correlated to corresponding pulse height values $PH_a$, $PH_b$ and $PH_c$, respectively, along the pulse height axis. The peak points on the spectra 62, 66 and 70 may be automatically determined by the control unit 40 using peak pick algorithms well known in the art.

To obtain the indication of the degree of quench present in the mixtures depicted in FIG. 3, the pulse height values $PH_a$, $PH_b$ and $PH_c$ may be compared or related to a pulse height value obtained in a similar manner for a calibration standard or reference mixture. For example, the level of quench represented by the spectra 60 and 62 may be selected as the reference quench level. The level or degree of quench present in each of the three examples may then be determined by subtracting the respective pulse height values $PH_a$, $PH_b$ and $PH_c$ from the reference pulse height level $PH_a$ to yield a quench number. Thus, the degree of quench present in the first example as compared to the reference is $PH_a$ minus $PH_a$ or zero. The degree of quench present in the second and third examples are then $PH_a$ minus $PH_b$ and $PH_a$ minus $PH_c$, respectively. It will be understood that although $PH_a$ has been selected as being indicative of the reference quench level and may, for example, correspond to the minimum degree of quench anticipated in all mixtures analyzed by the system of FIG. 1, other quench levels could be selected as the reference such as $PH_b$ or $PH_c$. Although the magnitude and signs of the quench numbers would differ in such instances, such quench numbers would still provide an indication of the degree of quench present in various mixtures.

The quench numbers just described may also be used to construct a quench curve in a conventional fashion. A quench curve relates counting efficiency to the degree or level of quench present in a liquid scintillation sample. Such a quench curve may be constructed in a conventional fashion, relating counting efficiencies to the corresponding quench numbers determined as described above. For example, assuming that the activity of the sample 11 and disintegrations per minute (DPM) is known, the sample is counted in a window W (FIG. 3) wide enough to span the entire energy range of the sample or any fraction of the window W. The counts obtained in the window W or the fraction thereof are related to the known sample DPM to determine efficiency and such efficiency is plotted with respect to the corresponding quench number. By repeating such steps for a plurality of samples having varying quench degrees or levels, the quench curve or relationship may be constructed.

Turning now to another aspect of the present invention, the number of liquid scintillation medium counts detected during a measurement period is used to determine the volume of sample 11 that has been measured during such period. The number of medium counts may be determined in a conventional fashion as, for example, by establishing a window V (FIG. 2) including all counts within the marker spectrum 54. Such may be accomplished by summing the counts stored in the storage locations within the storage area 54 for pulse height windows that fall within the window V. As an alternative, the area underneath the curve 54 may be determined in a conventional fashion to thus determine the medium counts.

With the medium counts determined, the volume of the liquid scintillation medium 18 is determined in accordance with the following:

$$\text{volume} = \frac{C}{T} \times \frac{V_o}{L}$$

where C is the medium counts, T is the time in minutes during which the counts C are measured, L is the activity in counts per minute (CPM) of the liquid scintillation medium 18, and $V_o$ is the volume of the liquid scintillation medium which produces the count rate L. As an example, 200 counts may be detected during 0.1 minute. With the specific activity of the liquid scintillation medium as described above, namely, 1,000 CPM per 100 $\mu l$, the volume of the liquid scintillation medium determined in accordance with the above equation is 200 $\mu l$.

With the volume of liquid scintillation medium determined, the volume of the sample 11 detected during the measurement period may also be found. To do so, the volume of liquid scintillation medium is related to the volume of sample according to the pumping ratio established by the pump controller 22. For example, the pump controller 22 may establish the ratio R of 1 ml liquid scintillation medium 18 to 0.2 ml sample 11. Continuing with the example described above, 200 $\mu l$ of liquid scintillation medium flowing during the measurement period corresponds to 40 $\mu l$ of sample.

Thus, the present invention enables the determination of quench and sample volume in a liquid scintillation flow system. As a consequence, the specific activity of the sample may be determined. In general terms, the specific activity of a sample is determined by measuring the count rate for the sample during a measurement period, determining the quench of the sample in accordance with the present invention, relating such quench to counting efficiency by means of a quench curve constructed as described above, correcting the sample count rate (CPM) to DPM with the efficiency obtained from the quench curve, determining the volume of the sample which flowed during the measurement period, and calculating samples specific activity from sample DPM and sample volume.

Continuing the example described above, the carbon 14 sample producing the spectrum 52 of FIG. 2 may generate a total count rate of 2000 CPM during the 0.1 minute measurement period described above. The peak of the marker spectrum 54 is found and a corresponding pulse height PHx is used to determine efficiency from a quench curve in a conventional fashion, with, for example, an efficiency of 85%, the count rate of the carbon 14 sample is corrected to a disintegrations rate of 2353 DPM. With 40 $\mu l$ of sample flowing through the system of FIG. 1 during the 0.1 minute measurement period, the specific activity of the sample is therefore 59 DPM/$\mu l$.

With a quench number determined as taught herein, quench correction may be performed as, for example, described in U.S. Pat. No. 4,029,401.

While a preferred embodiment of the invention has been illustrated and described, modifications may be made therein without departing from the spirit and scope of the invention as set forth by the appended claims. For example, although the medium 18 has been described as including a radionuclide marker, the marker may be combined with a conventional liquid scintillation compound by using another pump, mixer and pump controller as described above to provide a mixture having a specific activity per unit volume. Such a modification shall be included within the term "liquid scintillation medium" as used in the present application, including the appended claims.

What is claimed is:

1. A method for determining quench and volume in a liquid scintillation flow system, comprising the steps of:

flowing a mixture comprising the sample in a liquid scintillation medium through a flow detector and developing a pulse height distribution spectrum for the solution, the liquid scintillation medium comprising a scintillating material and an alpha emitting radionuclide marker having a predetermined activity;

detecting a unique point on the portion of the pulse height spectrum representing the energy spectrum of the marker and determining a pulse height value relating to the unique point;

comparing the pulse height value of the unique point to a pulse height value obtained in a like manner for a calibration standard, the difference between such pulse height values indicating a degree of quench present in the solution;

determining the number of counts of the liquid scintillation medium during the measurement period that the pulse height distribution spectrum was developed;

determining the volume of the liquid scintillation medium that flowed through the photodetector during the measurement period according to:

$$\text{volume} = \frac{C}{T} \times \frac{V_o}{L}$$

where C is the number of counts detected for the liquid scintillation medium, T is the time period, L is the activity of the liquid scintillation medium in counts per unit time, and $V_o$ is the volume of liquid scintillation medium which produces the count rate L.

2. The method as in claim 1 wherein the step of flowing the sample in the liquid scintillation medium through the flow detector further includes selecting a ratio R of the volume of sample with respect to the volume of liquid scintillation medium flowing through the flow detector, and the method further includes the step of determining the volume of the sample flowing through the flow detector during the measurement time period by relating the volume of the liquid scintillation medium flowing during such measurement time period to the ratio R.

3. A method as in claim 2 further including the steps of:

determining sample count rate during the measurement period;

correcting sample count rate by an efficiency value related to the degree of quench present in the mixture to yield sample disintegration rate; and determining sample specific activity by dividing sample disintegration rate by sample volume.

4. A method of measuring a value related to quench of a sample in a liquid scintillation flow system, comprising the steps of:
flowing a mixture comprising the sample in a liquid scintillation medium through a photodetector and developing a pulse height distribution spectrum for the solution, the liquid scintillation medium comprising a scintillating material and a radionuclide marker wherein the marker has an energy distribution different from the sample; and
detecting a unique point on the portion of the pulse height spectrum representing the energy of the marker and determining a pulse height value related to the unique point.

5. The method of claim 4 further including comparing the pulse height value of the unique point to a pulse height value obtained in a like manner for a calibration standard, the difference between such pulse height values indicating a degree of quench present in the solution.

6. The method as in claim 4 wherein the step of detecting the unique point on the spectrum representing the energy spectrum of the marker includes determining the peak thereof.

7. A method as in claim 4 wherein the marker is selected such that the marker energy spectrum does not overlap the sample energy spectrum.

8. The method as in claim 7 wherein the marker is an alpha emitting radionuclide.

9. A method of measuring quench in a liquid scintillation flow system, comprising the steps of:
flowing a mixture comprising the sample in a liquid scintillation medium through a flow detector and developing a pulse height distribution spectrum for the mixture, the liquid scintillation medium comprising a scintillating material and a radionuclide marker wherein the marker is selected as having an energy spectrum that does not overlap the sample energy spectrum;
detecting a unique point on the portion of the pulse height spectrum representing the energy spectrum of the marker and determining a pulse height value related to the unique point; and
comparing the pulse height value of the unique point to a pulse height value obtained in a like manner for a calibration standard, the difference between such pulse height values indicating a degree of quench present in the solution.

10. A method as in claim 9 wherein the marker is an alpha emitting radionuclide.

11. A method for determining the volume of a liquid scintillation medium flowing through a liquid scintillation flow system during a predetermined time period, comprising the steps of:
flowing a mixture comprising the sample in the liquid scintillation flow medium through a flow detector and developing a pulse height distribution spectrum for at least the liquid scintillation medium, the liquid scintillation medium comprising a scintillating material and a radionuclide marker wherein the marker has a predetermined activity and an energy distribution substantially different from the sample;
determining the counts detected by the flow detector for the portion of the spectrum representing the energy spectrum of the liquid scintillation medium; and
determining the volume of the liquid scintillation medium that flows through the flow detector during the time period according to:

$$\text{volume} = \frac{C}{T} \times \frac{V_o}{L}$$

where C is the number of counts detected for the liquid scintillation medium, T is the time period, L is the activity of the liquid scintillation medium in counts per unit time, and $V_o$ is the volume of liquid scintillation medium which produces the count rate L.

12. The method as in claim 11 wherein the step of flowing the mixture through the flow detector further includes selecting a ratio R of the volume of sample with respect to the volume of liquid scintillation medium flowing through the flow detector, and the method further includes the step of determining the volume of the sample flowing through the flow detector by relating the volume of the liquid scintillation medium to the ratio R.

* * * * *